Dec. 13, 1938.  F. K. BROWN  2,140,449
SCREW WITH SOCKETED HEAD AND PLURALITY OF SLOTS
Filed Feb. 10, 1937
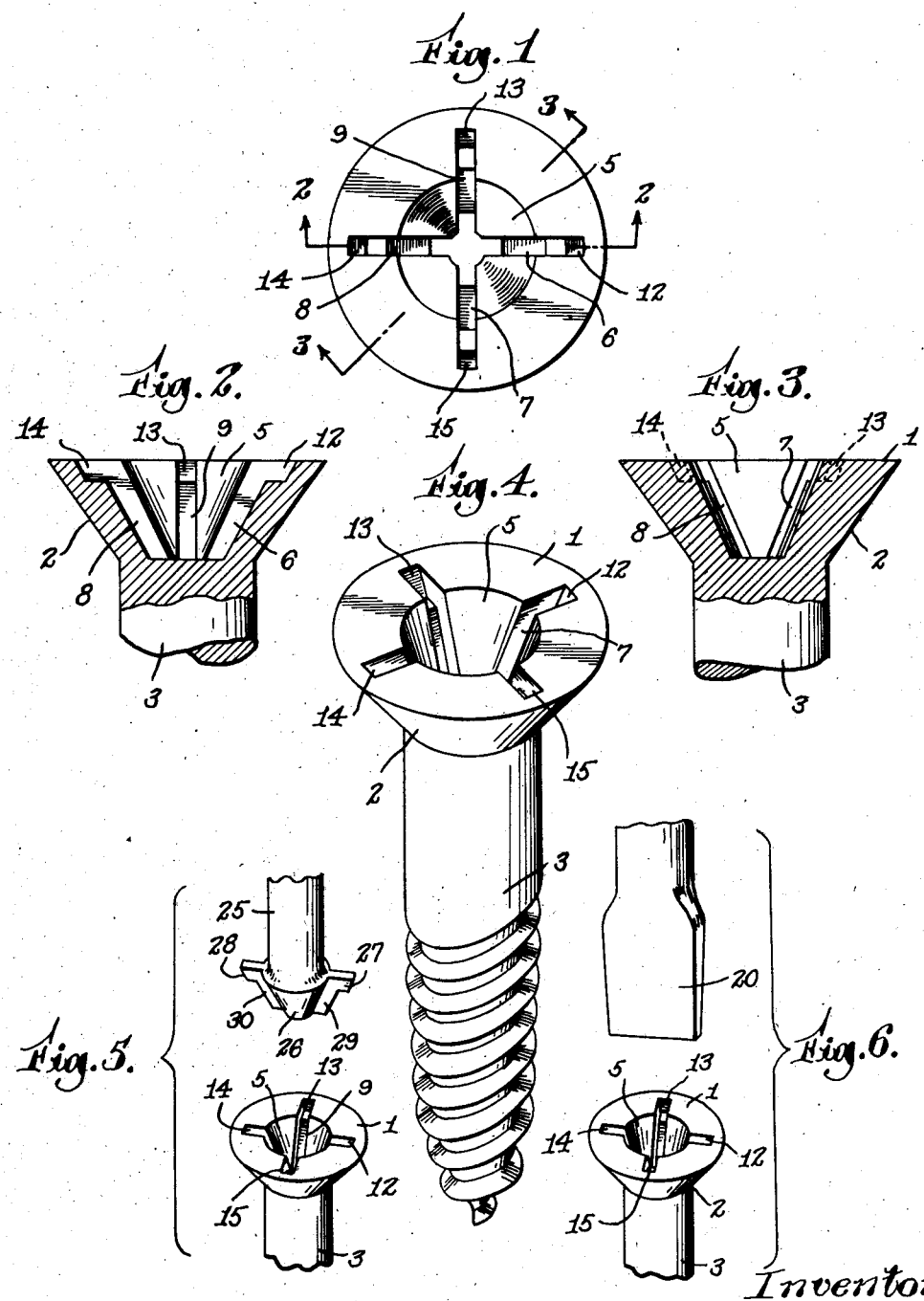
Inventor
Frank K. Brown
by James R. Hodder
Attorney Patented Dec. 13, 1938

2,140,449

UNITED STATES PATENT OFFICE 2,140,449

SCREW WITH SOCKETED HEAD AND PLURALITY OF SLOTS

Frank K. Brown, South Dartmouth, Mass., assignor to Continental Screw Company, New Bedford, Mass., a corporation of Massachusetts Application February 10, 1937, Serial No. 125,153

1 Claim. (Cl. 85—45)

My present invention is a novel and improved structure for the heads of screws, bolts, or the like, comprising both a socket and a plurality of slots, and constituting a modified and improved structure over my prior invention of application Ser. No. 115,935, filed Dec. 15, 1936.

As explained in my prior said copending application, I have devised and developed a novel structure for screw heads, bolts, or the like, comprising a socket or recess in the head, together with one or more pairs of slots opening therefrom to permit the utilization of a common screwdriver for turning the same; and I have developed this structure to utilize the highly beneficial and economical method of forging or swedging the socket or recess and slots directly in the head of the screw or bolt, and entirely within the periphery of the same, thus eliminating all cutting, sawing, or removal of the material, and on the contrary, strengthening, solidifying, and forging the mass of metal constituting the head into the final structure.

In my present invention I utilize the method of heading up the screw head forming the central recess and finally forming the slotted recesses to receive a common screwdriver, or any winged driving tool, for turning the screw, bolt, or the like or to hold it from turning, by progressive heading operations.

Also, I prefer to form the central recess in the construction of my present invention in a substantially circular or conical form, and thereupon to form the radially opening slots therefrom of considerably greater extent than the diameter of the central recess. This construction enables me to form the central conical recess by heading, hammering, or swaging operations with the walls of the conical recess being substantially uniform with the rounded sides of the screw head, thus giving an even condensing and strengthening action to the entire screw head, and thereby permitting a greater diameter of the slot portions to be formed nearer the periphery of the head without decreasing the strength of the structure.

Furthermore, by thus forming a relatively deep central conical recess and relatively shallow slot openings, but of greater diameter than that of the recess, I am enabled to utilize advantageously either a common screwdriver which spans the central recess and fits in the slots, or a winged tool which may extend into the central recess, and thus aid, assist, and cooperate in holding the portion extending into the slot openings and prevent the screwdriver from accidentally slipping out, as well also as to permit a winged screwdriver with a projecting cone to be wedged on the screw head and, hence, hold and carry the same on the end of the driver while fitting the screw in the work desired.

Thus it is an important object of my present invention to construct the head portions of screws, bolts, or the like with a deep conical socket to receive a corresponding formed conical portion of a driving tool to keep the driver from displacement during the operation of turning or holding the screw and also to permit the driver and screw to be wedged together for temporary assembling, together with a plurality of radially formed slots opening from the central recess and extending closer to the periphery of the head for greater turning leverage than would otherwise be possible without unduly weakening the structure of the metal in the head.

Thus I have formed a screw-turning portion to fit in a common screwdriver, or a special winged driving tool, together with a conical recess to act as a tool holding or wedging portion, and I have also utilized the advantages incident to the structure wherein either a special type of driver can be employed or a common screwdriver, such as explained fully and claimed broadly in my said copending application 115,935.

My present invention also utilizes the advantages of employing present standard methods and automatic machine operations in the manufacture of my improved construction, and is suitable for a combined holding socket and turning slot construction for screws, bolts, or similar articles, the recesses constituting a driver holding portion and the slots a driver turning portion, such slots, or a portion of them, extending nearer the periphery of the head than it would be feasible or possible to form the socket.

Also I may, and preferably do, form the turning slots or openings extending downwardly substantially opening from the walls of the conical recesses to cooperate with the winged driver together with the extra diameter slot openings in the top of the head to permit the cooperating action of the common screwdriver.

Referring to the drawing illustrating a preferred embodiment of my present invention, Fig. 1 is a plan view of the head of the screw, bolt, or the like, showing my combined conical socket and plurality of slots opening therefrom;

Fig. 2 is a cross-sectional view on the line 2—2 of Fig. 1;

Fig. 3 is a cross-sectional view on the line 3—3 of Fig. 1;

Fig. 4 is a perspective view;

Fig. 5 is a fragmentary view illustrating a special type of winged screwdriver to engage the recess and slots of my special construction, and Fig. 6 illustrates a standard type of screwdriver to cooperate with my improved structure.

Referring to the drawing, 1 designates the top of a typical type of standard screw having a bevelled face 2 and shank 3, although it will be appreciated that rounded or other contours of screw heads may be employed utilizing my combined conical recess and side slot construction. Formed within the head 1 and extending axially as far within the screw or bolt head as the bevelled face 2 is formed a central conical recess 5, and opening therefrom are a plurality of diametrically opposite slots 6 and 8 and 7 and 9, with additional slot openings or extensions nearer the periphery of the head 1 and of greater diameter than the recess 5; slots 6, 7, 8, and 9 are the extensions of said slots at the top, viz. 12, 13, 14, and 15 to receive a common screwdriver.

The central conical recess 5 as well as the side slots 6, 7, 8 and 9, and the extensions 12, 13, 14, and 15 are all formed by the automatic heading actions in high-speed modern machinery, one, two, or three such heading actions being sufficient to swage, press, and form the heads of screws, bolts, or the like into the contour of my improved construction.

As shown in Fig. 6, the diametrically opposite and extra wide recesses, 12 and 14 for example, or 13 and 15, constitute receiving slots for a common screwdriver 20, giving a substantial turning or holding leverage in the extra wide extensions formed by the slots 12 and 14 (or 13 and 15) to manipulate the screw by the screwdriver blade 20.

The walls of these recesses 12, 13, 14, and 15 are substantially vertical and therefore give a good turning leverage to the screwdriver blade 20 and to the head 1 of the screw, and are all formed within the periphery of the screw head as illustrated in the drawing.

In Fig. 5 I have illustrated a special winged type of screwdriver having a conical end portion 26 adapted to fit and wedge in the conical recess 5, which recess is a holding portion in the screw head to receive and hold the special driver as well as to prevent the slipping and displacement of the tool during the turning or holding operations during heavy strain or stress.

This special driver 25 has formed diametrically opposite winged members 27 and 28 of suitable length and contour to fit the extensions 12, 13, 14, and 15 and may have any desired additional ribs 29 and 30, also diametrically arranged and extending lengthwise of the conical end portion 26 to fit the corresponding grooves or slots 6, 7, 8, and 9 and effect a turning operation in combination with the winged portions 27 and 28. These ribs 29 and 30 may also aid and assist in holding and wedging the screwdriver 25 with the present construction of my improved form of socket and slot screw head so as to hold the screw temporarily on the driver until it is fitted and secured in the work desired.

In Fig. 5 I have illustrated a special winged type of driver 25 with two diametrically opposite slot-engaging members, but such a special driver may, if desired, have two pairs of such slot-engaging members to engage all four of the slot recesses 5 and opening from the conical center recesses 5 and thus gives still greater turning connection between the driver and screw head, when desired.

Thus it will be seen that I have devised a novel and improved type of combined socket and slot screw head structure wherein the central socket is a conical recess, not a triangular, square, or horizontal turning socket, but solely a central recess for swaging and strengthening the screw head during the forming operation and for receiving and holding a special driving tool formed with a similar or slightly diverging conical portion, together with a plurality of diametrically opposite slot openings or recesses radiating from said conical recess to constitute the screw-turning portions, which recesses are also formed and constructed to receive a special winged screwdriver or a common screwdriver.

I claim:

A screw of the kind described, having its head portion formed with a central socket in the contour of an inverted truncated cone, extending from the top surface of the screw inwardly and downwardly, and provided with a plurality of symmetrically-arranged, diametrically opposite slots rectangular in cross-section, and opening from the top face of the screw into the conical walls of the central recess.

FRANK K. BROWN.